United States Patent
Chyou et al.

(10) Patent No.: US 9,662,566 B1
(45) Date of Patent: May 30, 2017

(54) SYSTEM AND METHOD FOR IN-GAME ADVERTISING TO ASSIST IN RECRUITING OF AFFILIATION MEMBERS

(71) Applicant: KABAM, INC., San Francisco, CA (US)

(72) Inventors: Wynne Chyou, San Francisco, CA (US); John Kim, San Francisco, CA (US); Kevin Chanthasiriphan, San Francisco, CA (US); Albert Wei, San Francisco, CA (US); Chris Yu, San Francisco, CA (US)

(73) Assignee: Aftershock Services, Inc., San Francisco, CA (US)

( * ) Notice: Subject to any disclaimer, the term of this patent is extended or adjusted under 35 U.S.C. 154(b) by 652 days.

(21) Appl. No.: 14/254,769

(22) Filed: Apr. 16, 2014

(51) Int. Cl.
*A63F 13/00* (2014.01)
*A63F 13/30* (2014.01)
*G06Q 30/02* (2012.01)

(52) U.S. Cl.
CPC .......... *A63F 13/12* (2013.01); *G06Q 30/0275* (2013.01); *A63F 2300/5506* (2013.01)

(58) Field of Classification Search
CPC ...... A63F 13/828; A63F 13/847; A63F 13/87; A63F 13/12; A63F 2300/807
USPC ..................................................... 463/42, 43
See application file for complete search history.

(56) References Cited

U.S. PATENT DOCUMENTS

| | | | |
|---|---|---|---|
| 8,795,084 B2 * | 8/2014 | Bell ................... | H04W 4/02 463/29 |
| 2002/0160824 A1 * | 10/2002 | Goto ................... | A63F 13/12 463/9 |
| 2006/0105841 A1 | 5/2006 | Rom et al. .................... | 463/42 |
| 2006/0287106 A1 * | 12/2006 | Jensen ................. | A63F 13/335 463/42 |
| 2007/0087835 A1 | 4/2007 | Van Luchene .................. | 463/43 |
| 2008/0220877 A1 * | 9/2008 | Guthrie ................. | G06Q 30/08 463/42 |
| 2009/0325709 A1 * | 12/2009 | Shi ......................... | G06Q 10/10 463/42 |
| 2010/0197409 A1 * | 8/2010 | Van Luchene ......... | G07F 17/32 463/42 |
| 2012/0029987 A1 | 2/2012 | Kusumoto et al. ........ | 705/14.16 |

(Continued)

*Primary Examiner* — Michael Cuff
(74) *Attorney, Agent, or Firm* — Sheppard Mullin Richter & Hampton LLP

(57) ABSTRACT

A system and method for providing in-game advertising to assist in recruiting of affiliation members in an online game. The system and method include receiving affiliation advertising bids from affiliations for advertising opportunities. A bid indicating an aggregate amount of consideration is pledged by multiple users in an affiliation on behalf of the affiliation in a competitive auction with other affiliations for an advertising opportunity and determining winning affiliation advertising bids in competitive auctions for advertising opportunities. The system and method further include effectuating presentation of affiliation advertising content in advertising opportunities for affiliations that submit winning affiliation advertising bids such that in response to the first affiliation advertising bid being determined to be the winning affiliation advertising bid in the competitive auction for the first advertising opportunity, affiliation advertising content associated with the first affiliation is presented in the first advertising opportunity.

30 Claims, 7 Drawing Sheets

(56) References Cited

U.S. PATENT DOCUMENTS

| | | | |
|---|---|---|---|
| 2012/0077599 A1* | 3/2012 | Van Luchene | A63F 13/12 463/42 |
| 2012/0094757 A1* | 4/2012 | Vago | H04L 67/42 463/31 |
| 2013/0045806 A1* | 2/2013 | Bloodworth | A63F 9/24 463/43 |
| 2013/0254680 A1* | 9/2013 | Buhr | A63F 13/12 715/753 |
| 2013/0325572 A1 | 12/2013 | Plut | 705/14.16 |
| 2015/0057084 A1* | 2/2015 | Lin | A63F 13/795 463/42 |

* cited by examiner

SYSTEM AND METHOD FOR IN-GAME ADVERTISING TO ASSIST IN RECRUITING OF AFFILIATION MEMBERS

FIELD OF THE DISCLOSURE

This disclosure relates to a system and method for in-game advertising to assist in recruiting of affiliation members.

BACKGROUND

Players of on-line games trying to recruit members via online chat is known; however, conventional systems do not provide in-game advertising to assist in recruiting of affiliation members.

SUMMARY

One aspect of the disclosure relates to a system and method configured to provide in-game advertising to assist in recruiting of affiliation members in an online game. In some implementations, the system and method include executing an instance of an online game, and implementing the instance of the online game to facilitate participation of the user in the online game via a client computing platform. In some implementations, the system and method include recording memberships of users in affiliations, wherein affiliations are relationships between groups of users that have functional implications in the online game, the affiliations including a first affiliation to which a set of the users belong. In some implementations, the system and method include receive affiliation advertising bids from the affiliations for advertising opportunities, the affiliation advertising bids including a first affiliation advertising bid from the users in the first affiliation for a first advertising opportunity, the first affiliation advertising bid indicating an aggregate amount of consideration pledged by multiple users in the first affiliation on behalf of the first affiliation in a competitive auction with other affiliations for the first advertising opportunity. In some implementations, the system and method include determining winning affiliation advertising bids in competitive auctions for advertising opportunities. In some implementations, the system and method include effectuating presentation of affiliation advertising content in advertising opportunities for affiliations that submit winning affiliation advertising bids such that in response to the first affiliation advertising bid being determined to be the winning affiliation advertising bid in the competitive auction for the first advertising opportunity, affiliation advertising content associated with the first affiliation is presented in the first advertising opportunity.

In exemplary implementations, providing in-game advertising to assist in recruiting of affiliation members in an online game in an online game may be performed by processors executing computer program components. In some implementations, the system may include one or more servers. The server(s) may be configured to communicate with one or more client computing platforms according to a client/server architecture. The users may access the system via the client computing platforms, for instance, to engage in one or more games.

The server(s) may be configured to execute one or more computer program components to provide one or more games to users (or players). The computer program components may include one or more of a game component, a user profile management component, a space component, an affiliation management component, an affiliation advertising bid reception component, an auction component, an affiliation advertising component, and/or other components. It is noted that the client computing platforms may include one or more computer program components that are the same as or similar to the computer program components of the server(s) to facilitate individualized content made available to the users of online games.

The game component may be configured to execute an instance of an online game, and to implement the instance of the online game to facilitate participation of the user in the online game via client computing platforms.

The affiliation management component may be configured to record memberships of users in affiliations, wherein affiliations are relationships between groups of users that have functional implications in the online game, the affiliations including a first affiliation to which a set of the users belong.

The affiliation advertising bid reception component may be configured to receive affiliation advertising bids from the affiliations for advertising opportunities, the affiliation advertising bids including a first affiliation advertising bid from the users in the first affiliation for a first advertising opportunity, the first affiliation advertising bid indicating an aggregate amount of consideration pledged by multiple users in the first affiliation on behalf of the first affiliation in a competitive auction with other affiliations for the first advertising opportunity.

The auction component may be configured to determine winning affiliation advertising bids in competitive auctions for advertising opportunities.

The affiliation advertising component may be configured to effectuate presentation of affiliation advertising content in advertising opportunities for affiliations that submit winning affiliation advertising bids such that in response to the first affiliation advertising bid being determined to be the winning affiliation advertising bid in the competitive auction for the first advertising opportunity, affiliation advertising content associated with the first affiliation is presented in the first advertising opportunity.

One aspect of the disclosure relates to a computer-implemented method for providing in-game advertising to assist in recruiting of affiliation members in an online game. The method may be implemented in a computer system that includes one or more physical processors and storage media storing machine-readable instructions. The method includes managing user profiles of one or more users of the online game, and executing an instance of an online game. The method further includes executing an instance of an online game. The method further includes implementing the instance of the online game to facilitate participation of the user in the online game. The method further includes recording memberships of users in affiliations, wherein affiliations are relationships between groups of users that have functional implications in the online game, the affiliations including a first affiliation to which a set of the users belong. The method further includes detecting successful performance of speed-up quests by the user in the online game. The method further includes receiving affiliation advertising bids from the affiliations for advertising opportunities, the affiliation advertising bids including a first affiliation advertising bid from the users in the first affiliation for a first advertising opportunity, the first affiliation advertising bid indicating an aggregate amount of consideration pledged by multiple users in the first affiliation on behalf of the first affiliation in a competitive auction with other affiliations for the first advertising opportunity. The method further includes determining winning affiliation advertising bids in competitive auctions for advertising opportunities. The method further includes effectuating presentation of affiliation advertising content in advertising opportunities for affiliations that submit winning affiliation advertising bids such that in response to the first affiliation advertising bid being determined to be the winning affiliation advertising bid in the competitive auction for the first advertising opportunity, affiliation advertising content associated with the first affiliation is presented in the first advertising opportunity.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
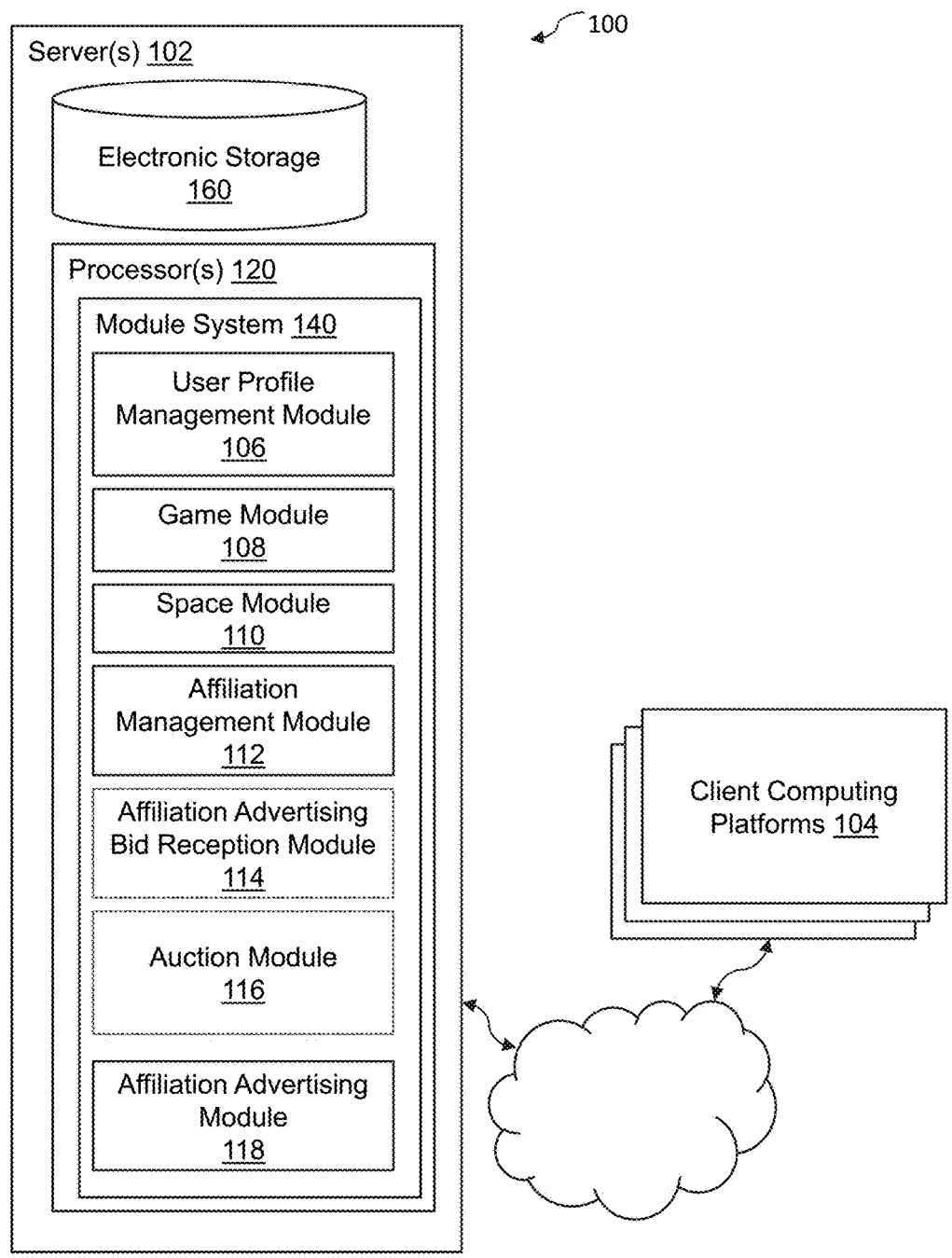
FIG. 1 illustrates a system configured to provide a virtual space for an online game, in accordance with one or more implementations.

FIG. 1 illustrates a system 100 configured to provide a virtual space to users. Providing the virtual space may include hosting the virtual space over a network. In some implementations, system 100 may include one or more servers 102. Server 102 may be configured to communicate with one or more client computing platforms 104 according to a client/server architecture. Users may access system 100 and/or the virtual space via client computing platforms 104.

The server 102 may be configured to execute one or more computer program components. The computer program components may include one or more of a user profile management component 106, a game component 108, a space component 110, an affiliation management component 112, an affiliation advertising bid reception component 114, an auction component 116, an affiliation advertising component 118, and/or other components. The client computing platform(s) 104 may include one or more computer program components that are the same as or similar to the computer program components of the example server(s) 102 to provide a virtual space to users and to facilitate in-game actions.

The user profile management component 106 may be configured to manage user profiles. Different users may have profiles associated with different game levels, entities, etc. Game entities include game characters, objects, simulated physical phenomena (e.g., wind, rain, earthquakes, and/or other phenomena), and/or other elements within the virtual space to interact with the virtual space and/or each other. Game elements include bases, forts, tanks, transport devices, cities, armies, soldiers, a wizard, an elf, or anything listed herein or externally that may be part of an online game. It is impractical to list all game objects, so any existing game object at time of filing or later is inferred as being a game entity.

A user profile management component 106 may be configured to record user profiles and/or user parameters associated with users of the system 100. The one or more user profiles and/or user information may include information stored by server 102, one or more of the client computing platforms 104, and/or other storage location. The user profiles may include, for example, past responses to speed-up quest offer(s), auxiliary content, information identifying users (e.g., a username or handle, a number, an identifier, and/or other identifying information) within the virtual space, virtual space account information, subscription information, virtual currency account information (e.g., related to currency held in credit for a user), virtual space usage information, interaction history among users in the virtual space, information stated by users, browsing history of users, a client computing platform identification associated with a user, a phone number associated with a user, and/or other information related to users.

The user profile management component 106 may also be configured to obtain values of user parameters for individual users. The user parameters may include one or more of a demographic parameter, a social parameter, a game parameter, a purchase parameter, an auxiliary content response parameter, a speed-up quest offer content response parameter, and/or other parameters. A demographic parameter may include one or more of age, sex, geographic location, language, income, education, career, marital status, and/or other demographic parameters. A social parameter may include one or more of a parameter derived from a social graph in a social network service, an in-game relationship, a platform from which the virtual space is accessed, and/or other social parameters. A game parameter may include one or more of an entity class, an entity faction, a usage amount, one or more usage times, a level, inventory in the virtual space, a score, and/or other game parameters. A purchase parameter may include a parameter determined from a purchase history of the user in the virtual space. An affiliation advertising response parameter may include a one or more of a user's response to past affiliation advertising notifications, past affiliation advertising content, and/or other parameters. An affiliation advertising offer(s) content response parameter may include a one or more of a user's response to past affiliation advertising(s) content, current or past consideration offers, and/or other parameters.

In an implementation, the game component 108 may be configured to execute an instance of an online game, and to implement the instance of the online game to facilitate participation of users in the online game via a client computing platform 104. Participation in the online game includes executing actions in the instance of the online game in response to receiving action requests from a user. Execution of some actions may be delayed from reception of a corresponding action request by a wait time, which is associated with the action.

Space component 110 may be configured to implement an instance of the virtual space executed by the computer components. The instance of the virtual space may reflect the state of the virtual space. The instance of the virtual space may be used to push state information to clients (e.g., client computing platforms 104) for implementation on the client, may be used to verify state information generated on client executing expressions of the instance locally, and/or for other purposes. State information may include information about the state of the virtual space such as, without limitation, position information of one or more objects, topography information, object status/shape information, battle information, score information, user or character progress information, user inventory information, user or character resource information, progress information for one or more activities or actions, view information describing a view of the virtual space, and/or other information that describes the state of the virtual space. Expressions of the instance executed on the client facilitate presentation of views on the client of the virtual space. Expressions of the instance executed on the client may be configured to simply present views of the virtual space based on the state information (e.g., via streaming view information, object/position information, and/or other state information) received from space component 110. Expressions of the instance executed on the client may include space logic that effectively provides for execution of a limited version of the instance on a client that is synchronized and/or verified with state information received from space component 110. The view presented on a given client may correspond to a location in the virtual space (e.g., the location from which the view is taken, the location the view depicts, and/or other locations), a zoom ratio, a dimensionality of objects, a point-of-view, and/or view parameters. One or more of the view parameters may be selectable by the user.

The instance of the virtual space may comprise a simulated space that is accessible by users via clients that present the views of the virtual space to a user. The simulated space may have a topography, express ongoing real-time interaction by one or more users, and/or include one or more objects positioned within the topography that are capable of locomotion within the topography. In some instances, the topography may be a 2-dimensional topography. In other instances, the topography may be a 3-dimensional topography. The topography may include dimensions of the space, and/or surface features of a surface or objects that are "native" to the space. In some instances, the topography may describe a surface (e.g., a ground surface) that runs through at least a substantial portion of the space. In some instances, the topography may describe a volume with one or more bodies positioned therein (e.g., a simulation of gravity-deprived space with one or more celestial bodies positioned therein). The instance executed by the computer components may be synchronous, asynchronous, and/or semi-synchronous.

The instance of the virtual space may comprise one or more user selectable actions. A user may select an action as part of online game play or as part of a quest or other activity within the online game. Example actions include fighting, developing a skill, building, crafting, modifying, upgrading, trading, selling, and/or repairing an item, an equipment, a building, and/or a structure; training, building, modifying, healing, requesting, upgrading, selling, and/or repairing an in-game unit; harvesting, refining, trading, selling, developing, spending, and/or consuming an in-game resource; using, performing, developing, modifying, upgrading, and/or training a skill, ability, and/or attribute; completing in-game travel, reloading a weapon, receiving assistance such as a hint and/or a clue, researching a technology a user wants to develop or to unlock in a game or dedicating resources and/or researchers to researching that technology, which may in turn lead to more technology development, and/or other actions.

Within the instance of the virtual space executed by space component 110, users may control characters, objects, simulated physical phenomena (e.g., wind, rain, earthquakes, and/or other phenomena), and/or other elements within the virtual space to interact with the virtual space and/or each other. The user characters may include avatars. As used herein, the term "user character" may refer to an object (or group of objects) present in the virtual space that represents an individual user. The user with which it is associated may control the user character. The user controlled element(s) may move through and interact with the virtual space (e.g., non-user characters in the virtual space, other objects in the virtual space). The user controlled elements controlled by and/or associated with a given user may be created and/or customized by the given user. The user may have an "inventory" of virtual goods and/or currency that the user can use (e.g., by manipulation of a user character or other user controlled element, and/or other items) within the virtual space.

The above description of the views of the virtual space determined from the instance executed by space component 110 is not intended to be limiting. The virtual space may be presented in a more limited, or richer, manner. For example, views of the virtual space may be selected from a limited set of graphics depicting an event in a given place within the virtual space. The views may include additional content (e.g., text, contextual pop-up windows, audio, pre-stored video content, and/or other content) that describes particulars of the current state of the place, beyond the limited set of graphics. For example, a view may include a generic battle graphic with a textual description of the opponents to be confronted. Other representations of individual places within the virtual space are contemplated.

The users may participate in the instance of the virtual space by controlling one or more of the available user controlled elements in the virtual space. Control may be exercised through control inputs and/or commands input by the users through client computing platforms 104. The users may interact with each other through communications exchanged within the virtual space. Such communications may include one or more of communications over an affiliation portal, textual chat, instant messages, email messages, private messages, voice communications, and/or other communications. Communications may be received and entered by the users via their respective client computing platforms 104. Communications may be routed to and from the appropriate users through server 102 (e.g., through space component 110).

The instance of the virtual space and/or the online game that takes place therein may be persistent. That is, the virtual space and/or the game may continue on whether or not individual players are currently logged in and/or participating in the game. A player that logs out of the virtual space and then logs back in some time later may find the virtual space has been changed through the interactions of other players with the virtual space during the time the player was logged out. These changes may include changes to the simulated physical space, changes in the player's inventory, changes in other player's inventories, changes experienced by non-player characters, changes to the virtual items available for use in the online game, and/or other changes.

Users may communicate with other users to form, promote, or participate in affiliations, such as alliances, levels, clans, teams, groups, or any other grouping or association amongst users. For example, an affiliation management component 112 may record memberships of users in affiliations. Affiliations may be relationships between groups of users that have functional implications in the online game. The affiliations may include a first affiliation to which a set of the users belongs. An affiliation management component 112 may provide a user with an affiliation interface whereby the user may form a new affiliation or search for an affiliation to join. An affiliation management component 112 may provide a user with tools to form a new affiliation by for example receiving input from the user that is associated with the new affiliation. Example affiliation input or content for an affiliation advertisement opportunity may be stored as one or more affiliation parameters, which may include any one or more of: an affiliation name, description, banner, mission statement, and criteria for members and other information. An affiliation management component 112 may store affiliation parameters.

An affiliation advertising bid reception component 114 may be configured to receive affiliation advertising bids from the affiliations for advertising opportunities. The affiliation advertising bids may include a first affiliation advertising bid from the users in the first affiliation for a first advertising opportunity. The first affiliation advertising bid may indicate an aggregate amount of consideration pledged by multiple users in the first affiliation on behalf of the first affiliation in a competitive auction with other affiliations for the first advertising opportunity.

An auction component 116 may be configured to determine winning affiliation advertising bids in competitive auctions for advertising opportunities.

An affiliation advertising component 118 may be configured to effectuate presentation of affiliation advertising content in advertising opportunities for affiliations that submit winning affiliation advertising bids. For example, in response to a first affiliation advertising bid being determined to be the winning affiliation advertising bid in the competitive auction for the first advertising opportunity, the affiliation advertising content associated with the first affiliation may be presented in a first advertising opportunity. For example, an advertising opportunity may include a banner, message-of-the-day, log in modal or the home page of the alliance feature. Members of an affiliation may be dedicated in promoting their affiliation by for example becoming the strongest affiliation in the realm for either tournament (reward) purposes or simply bragging rights on a leader board. Virtual space in the online game may be used for advertising an alliance by notifying affiliation members of an advertising opportunity. An advertising opportunity may enable an affiliation to present its advertising content in virtual space, such as in-game real estate space, such as on a part of the log-in modal may show a "featured alliance" and their advertising/promotion content. An affiliation advertising opportunity may include having the affiliation advertising content distributed across communication channels such as global chat, spamming, emails, or notification that may appear in a virtual space of an online game for other users of the online game to view the affiliation advertising content.

In some implementations, the server 102 and client computing platforms 104 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which servers 102 and client computing platforms 104 may be operatively linked via some other communication media.

A given client computing platform 104 may include one or more processors configured to execute computer program components. The computer program components may be configured to enable an expert or user associated with the given client computing platform 104 to interface with server 102, and/or provide other functionality attributed herein to client computing platforms 104. By way of non-limiting example, the given client computing platform 104 may include one or more of a desktop computer, a laptop computer, a handheld computer, a tablet computing platform, a NetBook, a Smartphone, a gaming console, and/or other computing platforms.

Server 102 may include electronic storage 160, one or more processors 180, and/or other components. Server 102 may include communication lines, or ports to enable the exchange of information with a network and/or other computing platforms. Illustration of server 102 in FIG. 1 is not intended to be limiting. Server 102 may include a plurality of hardware, software, and/or firmware components operating together to provide the functionality attributed herein to server 102. For example, server 102 may be implemented by a cloud of computing platforms operating together as server 102.

Electronic storage 160 may comprise non-transitory storage media that electronically stores information. The electronic storage media of electronic storage 160 may include one or both of system storage that is provided integrally (i.e., substantially non-removable) with server 102 and/or removable storage that is removably connectable to server 102 via, for example, a port (e.g., a USB port, a firewire port, etc.) or a drive (e.g., a disk drive, etc.). Electronic storage 160 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 160 may include one or more virtual storage resources (e.g., cloud storage, a virtual private network, and/or other virtual storage resources). Electronic storage 160 may store software algorithms, information determined by processor 180, information received from server 12, information received from client computing platforms 104, and/or other information that enables server 102 to function as described herein.

Processor(s) 120 is configured to provide information processing capabilities in server 102. As such, processor 180 may include one or more of a digital processor, an analog processor, a digital circuit designed to process information, an analog circuit designed to process information, a state machine, and/or other mechanisms for electronically processing information. Although processor 180 is shown in FIG. 1 as a single entity, this is for illustrative purposes only.

In some implementations, processor 180 may include a plurality of processing units. These processing units may be physically located within the same device, or processor 180 may represent processing functionality of a plurality of devices operating in coordination. The processor 180 may be configured to execute components 106, 108, 110, 112, 114, 116, and 118. Processor 180 may be configured to execute components 106, 108, 110, 112, 114, 116, and 118 by software; hardware; firmware; some combination of software, hardware, and/or firmware; and/or other mechanisms for configuring processing capabilities on processor 180. As used herein, the term "component" may refer to any component or set of components that perform the functionality attributed to the component. This may include one or more physical processors during execution of processor readable instructions, the processor readable instructions, circuitry, hardware, storage media, or any other components.

It should be appreciated that although components 106, 108, 110, 112, 114, 116, and 118 are illustrated in FIG. 1 as being implemented within a system 140 implemented by a single processing unit, in implementations in which processor 180 includes multiple processing units, one or more of components 106, 108, 110, 112, 114, 116, and 118 may be implemented remotely from the other components. The description of the functionality provided by the different components 106, 108, 110, 112, 114, 116, and 118 described below is for illustrative purposes, and is not intended to be limiting, as any of components 106, 108, 110, 112, 114, 116, and 118 may provide more or less functionality than is described. For example, one or more of components 106, 108, 110, 112, 114, 116, and 118 may be eliminated, and some or all of its functionality may be provided by other ones of components 106, 108, 110, 112, 114, 116, and 118. As another example, processor 180 may be configured to execute one or more additional components that may perform some or all of the functionality attributed below to one of components 106, 108, 110, 112, 114, 116, and 118.

Figure 2:
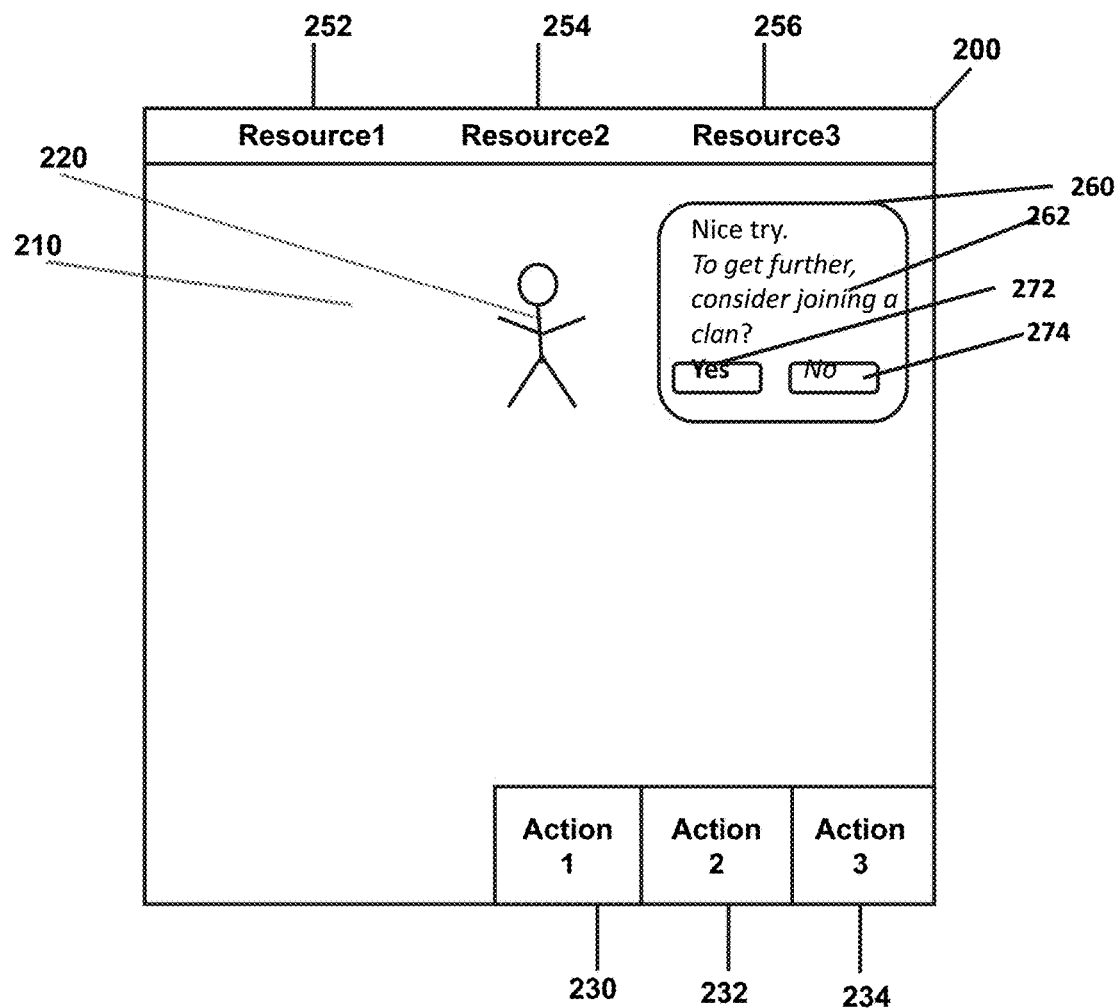
FIG. 2 illustrates an implementation of a virtual space interface wherein a user is presented with a notification to join an affiliation.

FIG. 2 illustrates an embodiment of a virtual space interface 200, which may be used to facilitate in game actions via computing platform 104. For example, the user controls a gaming entity 220. The space component 110 may present the user with a number of possible in game actions, e.g., 230, 232, 234 at any instance of the game. Virtual space interface 200 may be configured to display a virtual space 210 including game entities as described herein. A user may have acquired one or more resources 252, 254, 256 while playing the game. For example, a user may select a first action 230 that is associated with an attempt at achieving a particular level of play. A second action 232 may be associated with acquiring more resources, and a third action 234 may be associated with attacking another player. Any number or actions may be designed for according to the limits of an example component system 140 or a more distributed system 100, or a larger system 100 that may be further distributed across one or more client computing platform(s) 104. Other layouts of virtual space interface 200 are contemplated. The example embodiment illustrates in game actions that may be selected via the virtual space interface 200. Other forms of game action selection are contemplated with the disclosure described herein, such as other local or remote input for in game action selection. Some in game actions or achievements may be easier to acquire when the user is part of an affiliation. For example, a user may chose to start his own new affiliation or may choose to join an existing affiliation. A game component 108 may monitor user action during an instance of an online game to determine when the user might have benefited or moved further in the game if the user was part of an affiliation.

Starting new affiliations may be difficult as top members may be in other affiliations. Recruitment becomes important when an online game has affiliation features, such as affiliation competitions. Users of conventional online games have difficulty recruiting new users to their existing affiliations. In some instances users are unaware of the benefits of being part of an affiliation, or are unaware of the path toward becoming a member of an existing affiliation or a path toward forming a new affiliation. In an implementation a game component 108 may promote recruiting by affiliations and entice users into joining affiliations.

FIG. 2 illustrates an example of how a game component 108 may assist in recruiting of affiliation members. For example, when a user fails to achieve a certain online game accomplishment, such as reaching a level, acquiring a weapon, building a fort, etc. A game component 108 may assist in recruiting of alliance members. For example, a game component 108 may determine when a game action did not result in advancement in the game, and may effectuate a presentation of an in-game affiliation notification 260, such as a contextual pop-up window illustrated in FIG. 2. The notification 260 may include affiliation notification content 262 that provides the user with information of how to initiate into a path toward becoming a member of an existing affiliation or a path toward forming a new affiliation. The game component 108 may provide the user with an affiliation path access by for example presenting the user with an affiliation access selection 272, such as a "yes" button. Affiliation access selection 272 may be presented in the affiliation notification 260 or may be presented at any time in virtual space 210. For example, affiliation access selection 272 may be available during an instance of the online game at a time or any space of virtual space 210 of the online game. The affiliation notification 260 may include an exit selection 274, such as a "No" button or an "x" onto which a user may make a selection for removing the notification 260. Other presentations of an affiliation notification 260, besides the illustrated contextual pop-up window, are included but not listed and illustrated as it is impractical to list all prompt presentations which one of ordinary skill in the art at the time of the invention would infer.

Figure 3:
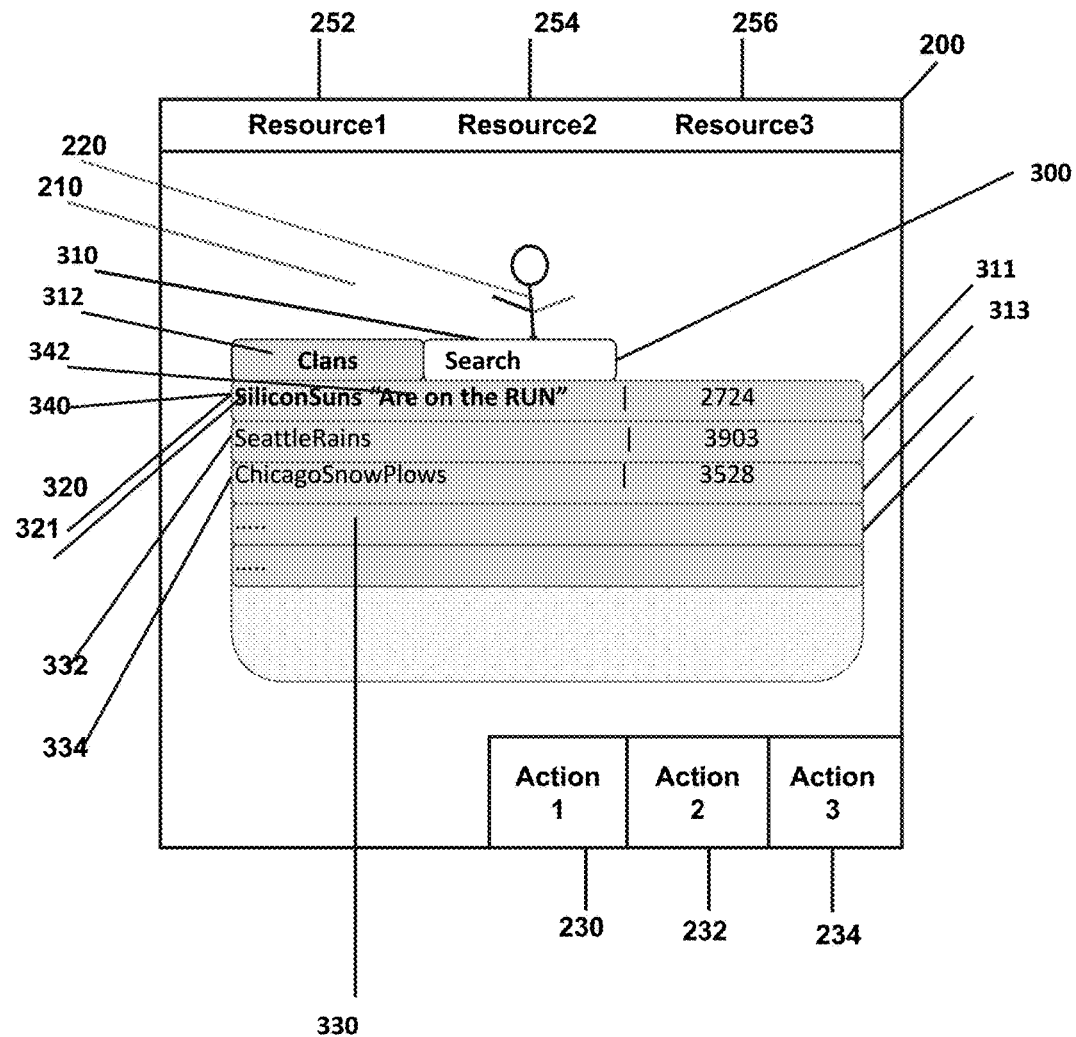
FIG. 3 illustrates an implementation of a virtual space interface wherein a user is presented with a listing of affiliations interested in recruiting new members.

FIG. 3 illustrates an implementation of a virtual space interface wherein a user is presented with a listing of affiliations interested in recruiting new members. For example, FIG. 3 illustrates an implementation of a virtual space interface 200 after a user has selected to receive affiliation information by making a selection on an affiliation notification 260. Virtual space interface 200 may display an affiliation listing 300 including further affiliation selections 312, 310, such as a "Clans" tab and a "Search Clans" tab. Virtual space interface 200 may indicate a featured affiliation 320 by for example, listing the affiliation as a first listed affiliation 321 and/or by presenting the featured affiliation in a different presentation that is more prominent from the other presentations presented on space interface 200. For example a featured affiliation 320 may be presented first and in bold typeface as illustrated by the example featured affiliation 320. A listing of other affiliations, such as clans or alliances or other groupings may be presented in any order. For example, as stated above, the first listed affiliation 321 may be a way of presenting the featured affiliation 320. For example, the affiliation with a name of "SiliconSuns" is an example of a featured affiliation 320 that may be granted a first listing 321 in an affiliation listing 330. Other affiliations may be listed in order of highest to lowest trophies (e.g. SiliconSuns have 2724 trophies, Seattle Rains have 3903 trophies and ChicagoSnowPlows have 3528 trophies) achieved or any other rating factor. For example, the affiliation with a name of "Seattle Rains" is listed as a second affiliation 332 and the affiliation with a name "ChicagoSnowPlows" is listed as a third affiliation 334. Other forms of presentation to have the featured affiliation 320 stand out on the space interface 200 are included, but are too numerous to list.

FIG. 3 illustrates an example of how an affiliation advertising component 118 may present an advertising opportunity including one or more of space in views of the online game presented to the users on the client computing platforms 104. For example, having an affiliation listed as a first listed affiliation 321 and as a featured affiliation 320 (e.g., presented in bold typeface) is an example of an advertising opportunity 340. Other examples of a space in a view of the online game includes a banner ad presented on a web page associated with the online game, an email, a pop up provided with views of the online game presented to the users on the client computing platforms, space in a login modal, or presented in views of a game leaderboard. An advertising opportunity may include affiliation advertising content 342. For example, affiliation advertising content 342 may include text, which a member of an affiliation submitted as content for their affiliation's advertising purposes, such as the example tag line "Re on the Run."

Figure 4:
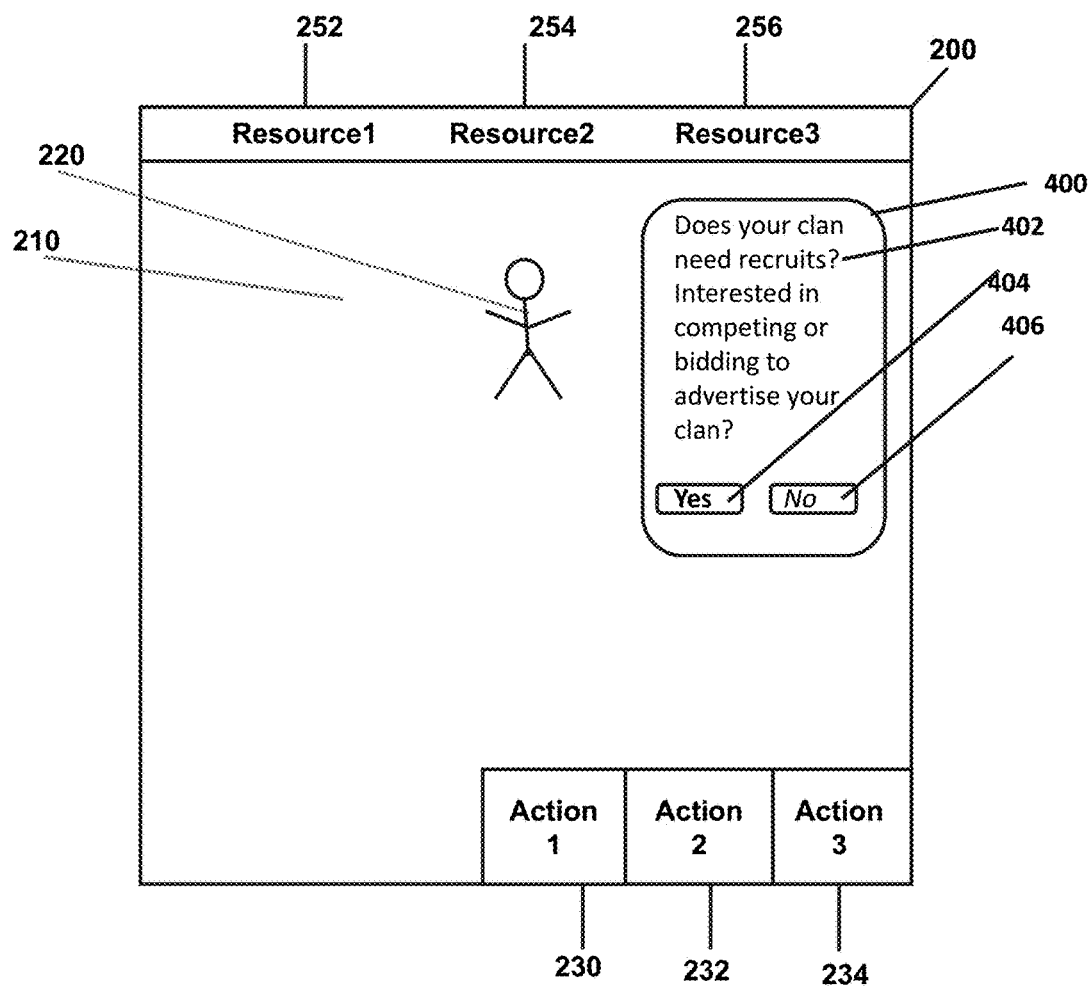
FIG. 4 illustrates an implementation of a virtual space interface wherein a user is presented with an affiliation advertising opportunity notification.

FIG. 4 illustrates an implementation of a virtual space interface wherein a user is presented with an affiliation advertising opportunity notification. For example, FIG. 4 illustrates a virtual space interface wherein a game component 108 has effectuated a presentation on a virtual space interface 200 of an affiliation advertising notification 400. An affiliation advertising notification 400 may include affiliation advertising notification content 402, such as the example text, "Does your clan need recruits? Interested in competing or bidding to advertise your clan?" or any other content that may be used to motivate or entice a user to join an affiliation, start an affiliation, or advertise or promote an existing affiliation. Other examples of affiliation advertising notification content 402 include other notifications of enticement that may be used to inform or entice the user about an affiliation advertising opportunity. The gaming component may effectuate presentation on an affiliation advertising access selection 404 or an exit selection 406. Other presentations known to one having ordinary skill in the art to provide affiliation advertising notification 400 or an affiliation advertising access selection 404 or an exit selection 406 are included, but too numerous to list.

Figure 5:
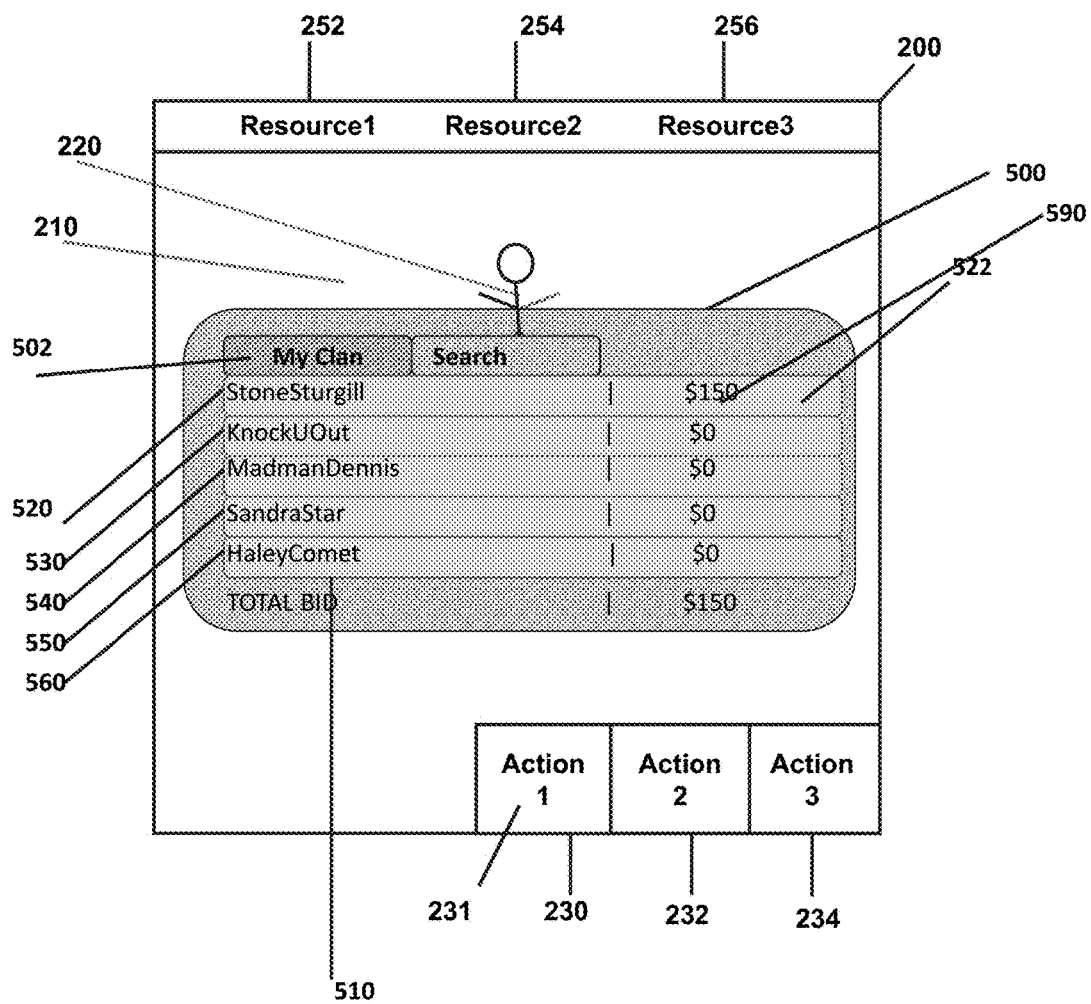
FIG. 5 illustrates an implementation of a virtual space interface wherein a user is presented with an affiliation bid interface configured to receive individual user pledge affiliation advertising considerations.

FIG. 5 illustrates an implementation of a virtual space interface wherein a user is presented with an affiliation bid interface configured to receive individual user pledge affiliation advertising considerations. For example, affiliation advertising bid reception component 114 may be further configured to effectuate presentation, on an affiliation bid interface 500, of each of the individual user pledged affiliation advertising considerations along with information about each respective associated affiliation member. For example, game component 108 may effectuate a presentation of an implementation of an affiliation bid interface 500, which receives bid input information from a user that is a member of an affiliation. Affiliation bid interface 500 may include one or more bid-interface selections. For example, a first bid-interface selection 502, such as a "My Clan" selection may cause the presentation of a member list 510 of all the members of a first affiliation to be effectuated on a virtual space 200, as illustrated in FIG. 5. For example, when a user selects bid interface selection 502, a affiliation advertising bid reception component 114 may list member advertising bid information including first member bid information 520. For example first member bid information may include a first member name (e.g. StoneSturgill) and a first member bid selection 522.

A user may select first member bid selection 522 to input a first member individual user pledge affiliation advertising consideration amount. For example, FIG. 5 illustrates an affiliation bid interface 500 wherein a user has input a first member individual user pledge affiliation advertising consideration amount of $150. Affiliation advertising bid reception component 114 may update its associated individual user pledge affiliation advertising consideration parameter to present the first member individual user pledge affiliation advertising consideration value 590 via the affiliation bid interface 500. Affiliation advertising bid reception component 114 may be configured to receive each of the multiple pledged affiliation advertising considerations as hard currency offers. For example, a user may submit a consideration via credit card transaction or check or other hard currency transaction methods.

Affiliation bid interface 500 may also list the rest of the members of an affiliation and their respective information including respective pledge consideration values. For example, second member bid information 530 may include second member name (e.g., KnockUOut) and consideration value, which may be set as a default amount of $0. Similarly, the third 540, fourth 550, fifth 560, and so on (not shown) member bid information may include respective names (e.g., MadManDennis, SandraStar, and HaleyComet, etc.) and a presentation of respective consideration values.

Figure 6:
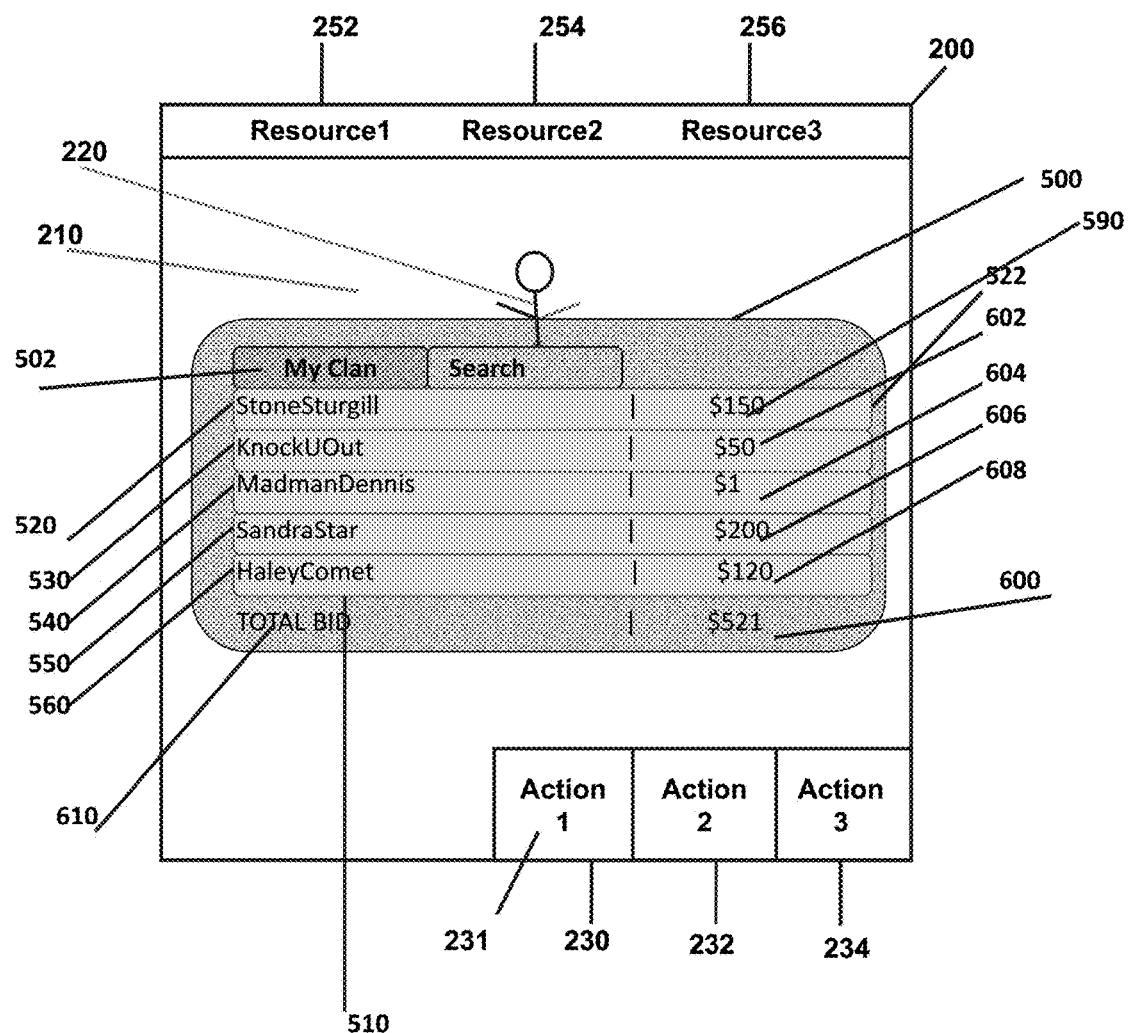
FIG. 6 illustrates an implementation of a virtual space interface wherein a user is presented with an affiliation bid interface configured to present an aggregate amount of consideration from the multiple individual user pledge affiliation advertising considerations submissions for an affiliation advertising opportunity.

FIG. 6 illustrates an implementation of a virtual space interface wherein a user is presented with an affiliation bid interface configured to present an aggregate amount of consideration from the multiple individual user pledge affiliation advertising considerations submissions for an affiliation advertising opportunity. Affiliation advertising bid reception component 114 may be configured to effectuate presentation of each of the individual user pledged affiliation advertising considerations along with information about each respective associated affiliation member. For example, affiliation advertising bid reception component 114 may have received consideration input values from multiple members of an affiliation. Affiliation advertising bid reception component 114 may have effectuated presentations of an amount of consideration submitted by each member. For example, information about each respective associated affiliation member may include that first member has a name KknockUOut and submitted a consideration value of $50 (602), second member has a name MadmanDennis and submitted a consideration value of $1 (604), third member has a name SandraStar and submitted a consideration value of $200 (606), and fourth member has a name HaleyComet and submitted a consideration value of $120 (608), etc.

Affiliation advertising bid reception component 114 may be configured to receive each of the multiple individual user pledged affiliation advertising considerations as hard currency offers to form an aggregate amount of consideration pledged by the multiple users in the first affiliation on behalf of the first affiliation representing, for the first affiliation, a sum of the total hard currencies offered by each member of the first affiliation. For example, affiliation advertising bid reception component 114 may effectuate presentation of an aggregate amount of consideration from the multiple individual user pledge affiliation advertising considerations submissions 600 for an affiliation advertising opportunity. The presentation of an aggregate amount of consideration from the multiple individual user pledge affiliation advertising considerations submissions 600 for an affiliation advertising opportunity may have an associated identifier 610 (e.g., "TOTAL BID"), which identifies the total amount in the affiliation bid interface 500. In the example case illustrated in FIG. 6, an example aggregate amount of consideration from the multiple individual user pledge affiliation advertising considerations submissions 600 is $521.

Game component 108 may provide one or more or every affiliation participating in an online game an opportunity to provide a bid for an affiliation advertising opportunity. Affiliation auction component 116 may be configured to determine which of the received affiliation advertising bids is the highest, and to award the affiliation which placed the highest affiliation advertising bid as being the winning alliance team. Affiliation auction component 116 may be configured to determine which of the received affiliation advertising bids is not the highest, and to refund each affiliation, which did not place the highest affiliation advertising bid, a refund. Auction component 116 may be configured to provide the winning affiliation with the presentation of their affiliation advertising content on the alliance bid interface.

Members of the winning affiliation may design their own content. Affiliation advertising component 118 may be configured to effectuate presentation of affiliation advertising content in advertising opportunities for affiliations that submit winning affiliation advertising bids such that in response to the first affiliation advertising bid being determined to be the winning affiliation advertising bid in the competitive auction for the first advertising opportunity, affiliation advertising content associated with the first affiliation is presented in the first advertising opportunity. Affiliation advertising component 118 may be configured to provide advertising content tools for generating the affiliation advertising content. Affiliation advertising component 118 may be configured to receive entry and/or selection of the affiliation advertising content from users in the affiliations that have won the auctions. Affiliation advertising content may include information about criteria for a desired member and a mission statement of the winning affiliation. Affiliation advertising component 118 may be configured to verify a final version of the affiliation advertising content is in accordance with game constraints or standards. Affiliation advertising component 118 may be configured to verify a final version of the affiliation advertising content is in accordance with game constraints or standards, and to produce a notification when the game constraints or standards are not met. Affiliation advertising component 118 may be configured to produce a notification including a warning that violations will result in a penalty or disbanding of the affiliation team. Presentation of the affiliation advertising content is associated with a presentation time window or a time duration associated with the first advertising opportunity. For example, affiliation advertising content may be shown for 24 hours the same day of the next week. For example, if the winning bid is determined tonight then the game will have the winning affiliations' adverting content shown for 24 hours the following week to provide the members of the affiliation time to create or adjust their affiliation advertising content.

Figure 7:
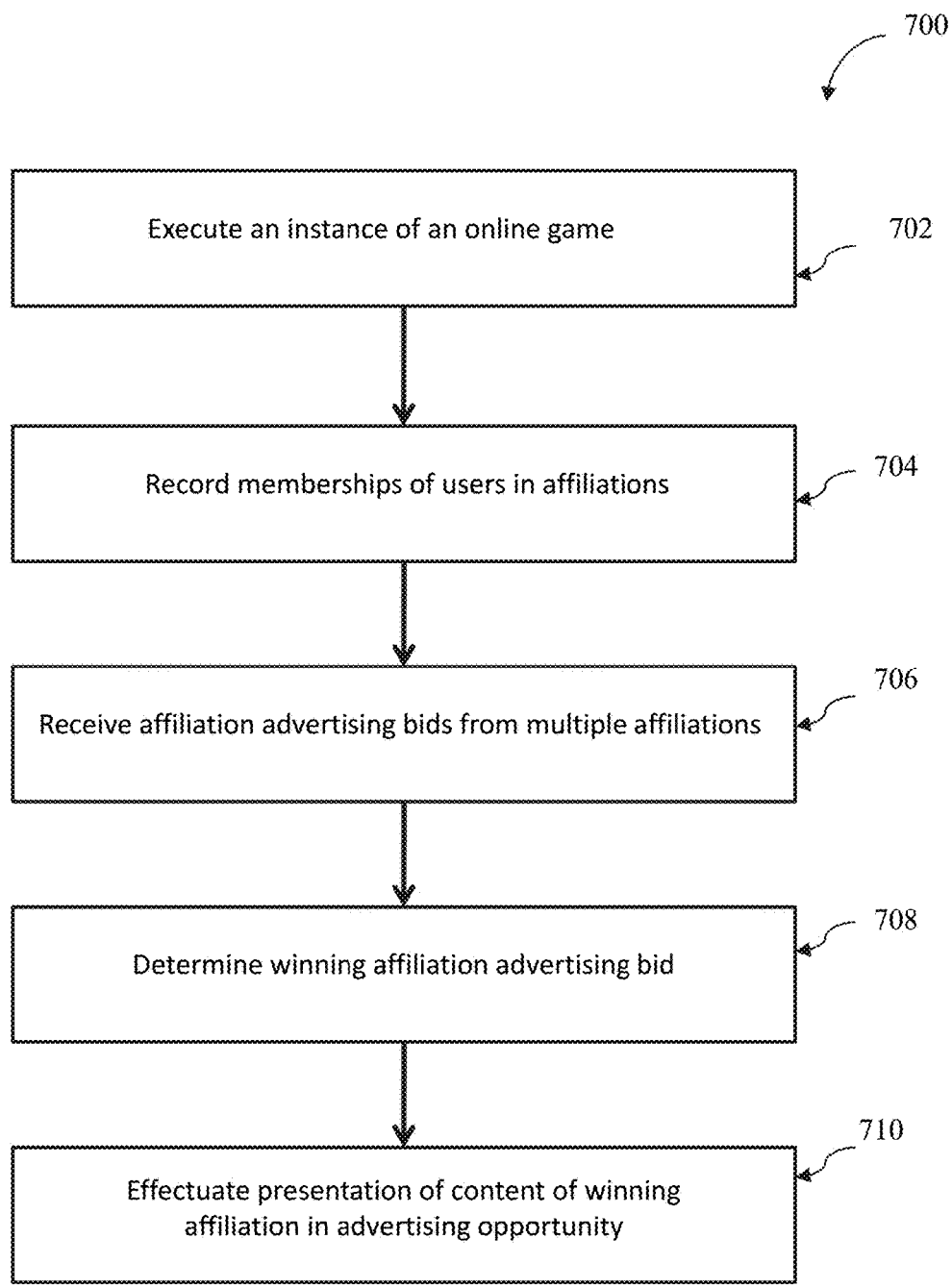
FIG. 7 illustrates an implementation of a method of providing in-game advertising to assist in recruiting of alliance members in an online game.

FIG. 7 illustrates an implementation of a method of providing in-game advertising to assist in recruiting of alliance members in an online game. The operations of method 700 presented below are intended to be illustrative. In some embodiments, method 700 may be accomplished with one or more additional operations not described, and/or without one or more of the operations discussed. Additionally, the order in which the operations of method 700 are illustrated in FIG. 7 and described below is not intended to be limiting.

In some embodiments, method 700 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 700 in response to instructions stored electronically on an electronic storage medium. The one or more processing devices may include one or more devices configured through hardware, firmware, and/or software to be specifically designed for execution of one or more of the operations of method 700.

At an operation 702 an instance of an online game may be executed. The instance of the online game may facilitate participation of the user in the online game via a client computing platform. Facilitating participation in the online game may include executing actions in the instance of the online game in response to receiving action requests from the user. Execution of the actions may be delayed from reception of corresponding action requests by wait times associated with the actions. Operation 604 may be performed by a game component that is the same as or similar to game component 108, in accordance with one or more implementation.

At an operation 704 recordation of membership information of users in affiliations may be executed. Operation 704 may be performed by affiliation management component that is the same as or similar to affiliation management component 112, in accordance with one or more implementation.

At an operation 706, reception of affiliation advertising bids from multiple affiliations may be executed. Operation 706 may be performed by an affiliation advertising bid reception component that is the same as or similar to affiliation advertising bid reception component 114, in accordance with one or more implementation.

At an operation 708, determination of a winning affiliation advertising bid may be executed. Operation 708 may be performed by an auction component that is the same as or similar to auction component 116, in accordance with one or more implementation.

At an operation 710, effectuation of presentation of content of a winning affiliation in an advertising opportunity may be executed. Operation 710 may be performed by an affiliation advertising component that is the same as or similar to affiliation advertising component 118, in accordance with one or more implementation.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system configured to provide in-game advertising to assist in recruiting of affiliation members in an online game, the system comprising:
one or more physical computer processors configured by machine-readable instructions to:
execute an instance of an online game, and to implement the instance of the online game to facilitate participation of the user in the online game via client computing platforms;
record memberships of users in affiliations, wherein affiliations are relationships between groups of users that have functional implications in the online game, the affiliations including a first affiliation to which a set of the users belong;
receive affiliation advertising bids from the affiliations for advertising opportunities, the affiliation advertising bids including a first affiliation advertising bid from the users in the first affiliation for a first advertising opportunity, the first affiliation advertising bid indicating an aggregate amount of consideration pledged by multiple users in the first affiliation on behalf of the first affiliation in a competitive auction with other affiliations for the first advertising opportunity;
determine winning affiliation advertising bids in competitive auctions for advertising opportunities; and
effectuate presentation of affiliation advertising content in advertising opportunities for affiliations that submit winning affiliation advertising bids such that in response to the first affiliation advertising bid being determined to be the winning affiliation advertising bid in the competitive auction for the first advertising opportunity, affiliation advertising content associated with the first affiliation is presented in the first advertising opportunity.

2. The system of claim 1 wherein the one or more physical computer processors are configured such that the first advertising opportunity includes one or more of space in views of the online game presented to the users on the client computing platforms, a banner ad presented on a web page associated with the online game, an email, a pop up provided with views of the online game presented to the users on the client computing platforms, space in a login modal, or presented in views of a game leaderboard.

3. The system of claim 1 wherein the one or more physical computer processors are further configured to receive entry and/or selection of the affiliation advertising content from users in the affiliations that have won the auctions.

4. The system of claim 1 wherein the affiliation advertising content includes information about criteria for a desired member and a mission statement of the winning affiliation.

5. The system of claim 1 wherein the one or more physical computer processors are further configured to receive each of the multiple pledged affiliation advertising considerations as hard currency offers.

6. The system of claim 1 wherein the one or more physical computer processors are further configured to receive each of the multiple individual user pledged affiliation advertising considerations as hard currency offers to form the aggregate amount of consideration pledged by the multiple users in the first affiliation on behalf of the first affiliation representing, for the first affiliation, a sum of the total hard currencies offered by each member of the first affiliation.

7. The system of claim 6 wherein the one or more physical computer processors are further configured to effectuate presentation of each of the individual user pledged affiliation advertising considerations along with information about each respective associated affiliation member.

8. The system of claim 6 wherein the one or more physical computer processors are further configured to effectuate presentation, on an affiliation bid interface, of each of the individual user pledged affiliation advertising considerations along with information about each respective associated affiliation member.

9. The system of claim 1 wherein the one or more physical computer processors are further configured to provide advertising content tools for generating the affiliation advertising content.

10. The system of claim 9 wherein the one or more physical computer processors are further configured to verify a final version of the affiliation advertising content is in accordance with game constraints or standards.

11. The system of claim 9 wherein the one or more physical computer processors are further configured to verify a final version of the affiliation advertising content is in accordance with game constraints or standards, and to produce a notification when the game constraints or standards are not met.

12. The system of claim 10 wherein the one or more physical computer processors are further configured to produce a notification including a warning that violations will result in a penalty or disbanding of the affiliation team.

13. The system of claim 1 wherein the presentation of the affiliation advertising content is associated with a presentation time window or a time duration associated with the first advertising opportunity.

14. The system of claim 1 wherein the one or more physical computer processors are further configured to determine which of the received affiliation advertising bids is the highest, and to award the affiliation which placed the highest affiliation advertising bid as being the winning alliance team, and to provide the winning affiliation with the presentation of their affiliation advertising content on the alliance bid interface.

15. The system of claim 1 wherein the one or more physical computer processors are further configured to determine which of the received affiliation advertising bids is not the highest, and to refund each affiliation, which did not place the highest affiliation advertising bid, a refund.

16. A computer-implemented method for providing in-game advertising to assist in recruiting of affiliation members in an online game, the method being implemented in a computer system that includes one or more physical processors and storage media storing machine-readable instructions, the method comprising:
executing an instance of an online game;
implementing the instance of the online game to facilitate participation of the user in the online game;
providing a gaming interface to the user;
recording memberships of users in affiliations, wherein affiliations are relationships between groups of users that have functional implications in the online game, the affiliations including a first affiliation to which a set of the users belong;
receiving affiliation advertising bids from the affiliations for advertising opportunities, the affiliation advertising bids including a first affiliation advertising bid from the users in the first affiliation for a first advertising opportunity, the first affiliation advertising bid indicating an aggregate amount of consideration pledged by multiple users in the first affiliation on behalf of the first affiliation in a competitive auction with other affiliations for the first advertising opportunity;

determining winning affiliation advertising bids in competitive auctions for advertising opportunities; and effectuating presentation of affiliation advertising content in advertising opportunities for affiliations that submit winning affiliation advertising bids such that in response to the first affiliation advertising bid being determined to be the winning affiliation advertising bid in the competitive auction for the first advertising opportunity, affiliation advertising content associated with the first affiliation is presented in the first advertising opportunity.

17. The method of claim 16 wherein the first advertising opportunity includes one or more of space in views of the online game presented to the users on the client computing platforms, a banner ad presented on a web page associated with the online game, an email, a pop up provided with views of the online game presented to the users on the client computing platforms, space in a login modal, or presented in views of a game leaderboard.

18. The method of claim 16 further comprising receiving entry and/or selection of the affiliation advertising content from users in the affiliations that have won the auctions.

19. The method of claim 16 wherein the affiliation advertising content includes information about criteria for a desired member and a mission statement of the winning affiliation.

20. The method of claim 16 further comprising receiving each of the multiple pledged affiliation advertising considerations as hard currency offers.

21. The method of claim 16 further comprising receiving each of the multiple individual user pledged affiliation advertising considerations as hard currency offers to form the aggregate amount of consideration pledged by the multiple users in the first affiliation on behalf of the first affiliation representing, for the first affiliation, a sum of the total hard currencies offered by each member of the first affiliation.

22. The method of claim 21 further comprising effectuating presentation of each of the individual user pledged affiliation advertising considerations along with information about each respective associated affiliation member.

23. The method of claim 21 further comprising effectuating presentation, on an affiliation bid interface, of each of the individual user pledged affiliation advertising considerations along with information about each respective associated affiliation member.

24. The method of claim 16 further comprising providing advertising content tools for generating the affiliation advertising content.

25. The method of claim 24 further comprising verifying a final version of the affiliation advertising content is in accordance with game constraints or standards.

26. The method of claim 24 further comprising verifying a final version of the affiliation advertising content is in accordance with game constraints or standards, and to produce a notification when the game constraints or standards are not met.

27. The method of claim 25 further comprising producing a notification including a warning that violations will result in a penalty or disbanding of the affiliation team.

28. The method of claim 16 wherein the presentation of the affiliation advertising content is associated with a presentation time window or a time duration associated with the first advertising opportunity.

29. The method of claim 16 further comprising determining which of the received affiliation advertising bids is the highest, and to award the affiliation which placed the highest affiliation advertising bid as being the winning alliance team, and to provide the winning affiliation with the presentation of their affiliation advertising content on the alliance bid interface.

30. The method of claim 16 further comprising determining which of the received affiliation advertising bids is not the highest, and to refund each affiliation, which did not place the highest affiliation advertising bid, a refund.

* * * * *